(12) United States Patent
Barraud et al.

(10) Patent No.: US 11,504,668 B2
(45) Date of Patent: Nov. 22, 2022

(54) FACILITY AND METHOD FOR THE TREATMENT BY MEMBRANE PERMEATION OF A GAS STREAM WITH ADJUSTMENT OF THE THIRD-PERMEATE SUCTIONING PRESSURE

(71) Applicant: L'Air Liquide, Societe Anonyme pour l'Etude et l'Exploitation des Procedes Georges Claude, Paris (FR)

(72) Inventors: Francois Barraud, Sassenage (FR); Jean-Marc Chareyre, Sassenage (FR)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 231 days.

(21) Appl. No.: 16/712,401

(22) Filed: Dec. 12, 2019

(65) Prior Publication Data
US 2020/0188843 A1 Jun. 18, 2020

(30) Foreign Application Priority Data
Dec. 14, 2018 (FR) ...................................... 1872940

(51) Int. Cl.
*B01D 53/22* (2006.01)
*F04B 39/16* (2006.01)

(52) U.S. Cl.
CPC ...... *B01D 53/228* (2013.01); *B01D 2256/245* (2013.01); *B01D 2257/504* (2013.01); *B01D 2258/05* (2013.01); *F04B 39/16* (2013.01)

(58) Field of Classification Search
CPC ............. B01D 53/22; B01D 2256/245; B01D 2257/504; B01D 2258/05; F04B 39/16
See application file for complete search history.

(56) References Cited

U.S. PATENT DOCUMENTS

| 7,537,641 B2 | 5/2009 | Lokhandwala et al. |
| 2013/0098242 A1 | 4/2013 | Ungerank et al. |
| 2018/0223205 A1 | 8/2018 | Mitariten |
| 2019/0224617 A1* | 7/2019 | Mitariten ................ C07C 7/005 |

FOREIGN PATENT DOCUMENTS

| AT | 515 137 | 1/2016 |
| EP | 2 735 355 | 5/2014 |
| WO | WO 2014/183977 | 11/2014 |

OTHER PUBLICATIONS

French Search Report and Written Opinion for FR 1 872 940, dated Oct. 16, 2019.

\* cited by examiner

*Primary Examiner* — Youngsul Jeong
(74) *Attorney, Agent, or Firm* — Christopher J. Cronin

(57) ABSTRACT

Facility and method for membrane permeation treatment of a feed gas stream containing at least methane and carbon dioxide including first, second, and third membrane separation units each including at least one membrane that is more permeable to carbon dioxide than to methane, wherein a permeate from the first membrane separation unit is fed to the third membrane separation unit and a retentate from the first membrane separation unit is fed to the second membrane separation unit. A compressor B adjusts the third-permeate suctioning pressure as a function of the feed gas stream pressure and the second retentate methane concentration.

11 Claims, 1 Drawing Sheet

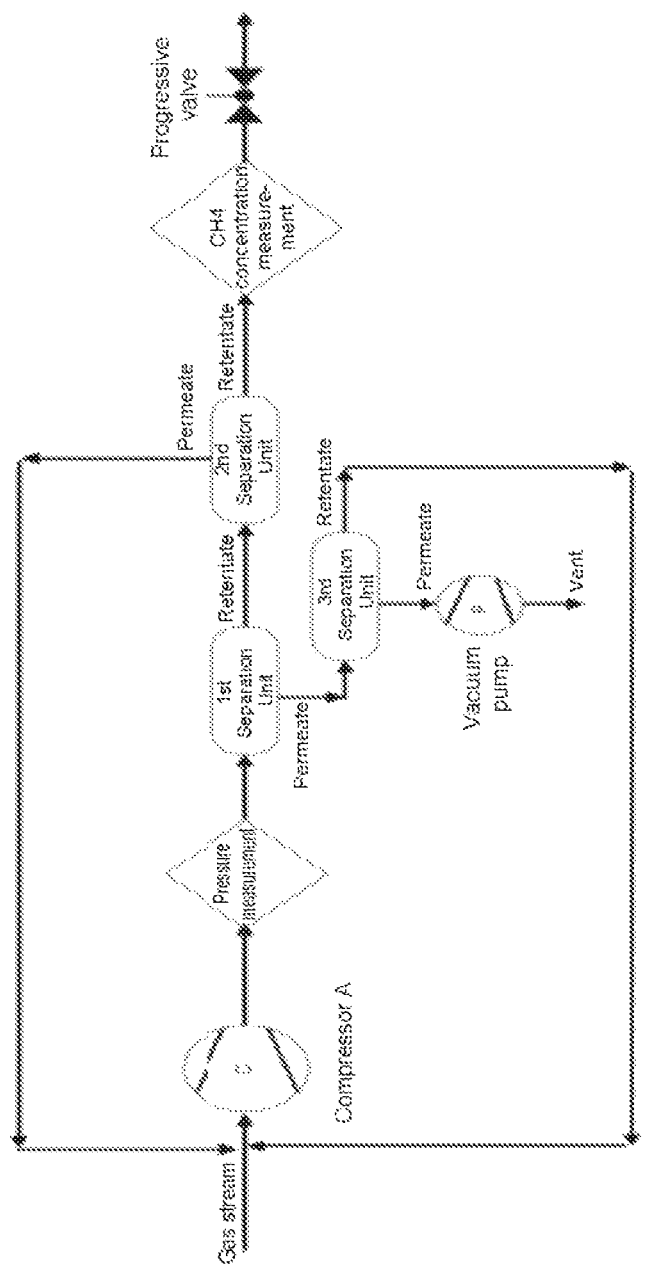

FACILITY AND METHOD FOR THE TREATMENT BY MEMBRANE PERMEATION OF A GAS STREAM WITH ADJUSTMENT OF THE THIRD-PERMEATE SUCTIONING PRESSURE

CROSS-REFERENCE TO RELATED APPLICATIONS

This application claims the benefit of priority under 35 U.S.C. § 119 (a) and (b) to French patent application No. FR 1872940, filed Dec. 14, 2018, the entire contents of which are incorporated herein by reference.

BACKGROUND

Field of the Invention

The present invention relates to a facility for the treatment by membrane permeation of a gas stream containing at least methane and carbon dioxide in order to produce a methane-rich gas stream, of which the methane content meets the requirements of its use, and to a method for controlling such a facility.

The invention relates in particular to the purification of biogas, for the purpose of producing biomethane in accordance with the specifications for injection into a natural gas network.

Related Art

Biogas is the gas produced during the degradation of organic matter in the absence of oxygen (anaerobic fermentation), also referred to as methanization. This may be natural degradation—it is thus observed in marshland or in household waste landfills—but the production of biogas may also result from the methanization of waste in a dedicated reactor referred to as a methanizer or digester.

By virtue of its main constituents—methane and carbon dioxide—biogas is a powerful greenhouse gas; at the same time, it also constitutes a source of renewable energy that is appreciable in the context of the increasing scarcity of fossil fuels.

Biogas contains mainly methane ($CH_4$) and carbon dioxide ($CO_2$) in proportions that can vary according to the way in which it is obtained, but also contains, in smaller proportions, water, nitrogen, hydrogen sulfide, oxygen and other organic compounds, in trace form.

Depending on the organic matter that has been broken down and on the techniques used, the proportions of the components differ, although on average biogas contains, on a dry gas basis, from 30 to 75% methane, from 15 to 60% $CO_2$, from 0 to 15% nitrogen, from 0 to 5% oxygen and trace compounds.

Biogas is put to profitable use in various ways. It may, after light treatment, be put to profitable use near the production site in order to supply heat, electricity or a mixture of both (cogeneration); the high carbon dioxide content reduces its calorific value, increases the costs of compression and transport and limits the economic benefit of this way of putting it to profitable use nearby.

Purifying biogas to a greater degree allows it to be put to broader use; in particular, extensive purification of biogas yields a biogas that has been purified to the specifications of natural gas and which can be substituted for the latter; biogas thus purified is known as "biomethane". Biomethane thus supplements the natural gas resources with a renewable proportion produced within the territories; it can be put to exactly the same uses as natural gas of fossil origin. It can be fed into a natural gas network, a vehicle filling station; it can also be liquefied to be stored in the form of liquefied natural gas (LNG), etc.

The ways in which biomethane is put to profitable use are determined according to the local context: local energy requirements, possibilities for putting it to profitable use as a biomethane fuel, and whether there is a natural gas transport or distribution network nearby, in particular. By creating synergy between the various parties operating in a given territory (farmers, manufacturers, civic authorities), the production of biomethane assists the territories in acquiring greater energy autonomy.

There are a number of steps that need to be completed between collecting the biogas and obtaining biomethane, the end-product that can be compressed or liquefied.

In particular, there are several steps needed prior to the treatment which is aimed at separating out the carbon dioxide in order to produce a stream of purified methane. A first step is to compress the biogas which has been produced and brought in at atmospheric pressure, and this compression can be obtained—in the conventional way—using a compressor. The next steps are aimed at ridding the biogas of its corrosive components which are hydrogen sulfide and the volatile organic compounds (VOCs); the technologies used are, in the conventional way, pressure swing adsorption (PSA) and capture on activated carbon. Next comes the step which consists in separating the carbon dioxide in order ultimately to obtain methane at the purity required for its subsequent use.

Carbon dioxide is a contaminant typically present in natural gas and it is common practice to need to remove it therefrom. Varying technologies are used for this depending on the situation; among these, membrane technology performs particularly well when the $CO_2$ content is high; and it is therefore used for separating the $CO_2$ present in biogas originating from released gases or plant or animal waste digesters.

Membrane gas separation methods used for purifying a gas, whether they employ one or more membrane stages, need to make it possible to produce a gas at the required quality, at a low cost, while at the same time minimizing the losses of the gas that is to be put to profitable use. Thus, in the case of biogas purification, the separation performed is chiefly a $CH_4/CO_2$ separation which needs to allow the production of a gas containing, depending on its use, more than 85% $CH_4$, preferably more than 95% $CH_4$, more preferentially more than 97.5% $CH_4$, while minimizing the $CH_4$ losses in the residual gas and the cost of purification, the latter to a large extent being associated with the electricity consumption of the device that compresses the gas upstream of the membranes.

It is preferable for the natural gas network to receive a stream of methane at a methane concentration that is constant, so that the equipment that uses the biomethane can operate uniformly.

On that basis, one problem that arises is that of providing a facility that makes it possible to obtain a stream of methane at a constant concentration.

SUMMARY OF THE INVENTION

One solution of the present invention is a facility for the membrane permeation treatment of a feed gas stream containing at least methane and carbon dioxide, comprising:
a compressor A for compressing the feed gas stream, a first membrane separation unit able to receive the gas stream coming from the compressor and to supply a first permeate and a first retentate, a second membrane separation unit able to receive the first retentate and to supply a second permeate and a second retentate, a third membrane separation unit able to receive the first permeate and to supply a third permeate and a third retentate, at least one means for measuring the pressure of the feed gas stream at the inlet of the first membrane separation unit, at least one means for measuring the $CH_4$ concentration in the second retentate, and at least one compressor B for adjusting the third-permeate suctioning pressure as a function of the measured pressure of the feed gas stream and of the methane concentration measured in the second retentate, with each membrane separation unit comprising at least one membrane that is more permeable to carbon dioxide than to methane.

The at least one means for measuring the pressure of the feed gas stream at the inlet of the first membrane separation unit typically is a pressure sensor. The at least one means for measuring the $CH_4$ concentration in the second retentate is typically a $CH_4$ analyser.

BRIEF DESCRIPTION OF THE FIGURES

The FIGURE represents an example of a facility according to the invention, wherein the compressor B is likened to a vacuum pump P.

DETAILED DESCRIPTION OF THE INVENTION

Depending on the case, the facility according to the invention may have one or more of the following features:
the third retentate is recycled to the feed gas stream upstream of the compressor A;
the second permeate is recycled to the feed gas stream upstream of the compressor A;
the membranes used in the membrane separation units have the same selectivity;
at least one membrane separation unit comprises at least two membranes.

A subject of the present invention is also a method for controlling a facility as defined in the invention, comprising the following steps:
a) measuring the pressure of the feed gas stream at the inlet of the first membrane separation unit,
b) measuring the $CH_4$ concentration in the second retentate,
c) comparing the pressure measured in step a) and the concentration measured in step b) with setpoint values, and determining the difference relative to these setpoint values,
and
d) a step of adjusting the third-permeate suctioning pressure by means of the compressor B.

Depending on the case, the method according to the invention may have one or more of the features below:
in step d), the third-permeate suctioning pressure is adjusted by means of the compressor B and the pressure of the feed gas stream is adjusted by means of the compressor A or by means of a progressive shut-off and pressurizing valve;

the adjusting of the pressure of the feed gas stream comprises increasing or decreasing the pressure;
in the adjusting step, the compressor B is subjected to an acceleration or deceleration. It should be noted that an acceleration of the compressor B will make it possible to reduce the pressure level of the third permeate, while a deceleration of the compressor B will make it possible to increase the pressure level of the third permeate;
the comparison step and the adjustment step are carried out automatically by data transmission and data processing means;
the feed gas stream is biogas.

A data transmission and data processing means may for example be an industrial processor of the programmable controller type.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A facility for membrane permeation treatment of a feed gas stream containing at least methane and carbon dioxide, comprising:
a compressor A for compressing the feed gas stream;
a first membrane separation unit able to receive the feed gas stream coming from the compressor A and to supply a first permeate and a first retentate;

a second membrane separation unit able to receive the first retentate and to supply a second permeate and a second retentate;

a third membrane separation unit able to receive the first permeate and to supply a third permeate and a third retentate;

at least one means for measuring a pressure of the feed gas stream at an inlet of the first membrane separation unit;

at least one means for measuring a $CH_4$ concentration in the second retentate; and at least one compressor B for adjusting a third-permeate suctioning pressure as a function of a measured pressure of the feed gas stream and of a measured methane concentration of the second retentate, wherein each membrane separation unit comprises at least one membrane that is more permeable to carbon dioxide than to methane.

2. The facility of claim 1, wherein the third retentate is recycled to the feed gas stream upstream of the compressor A.

3. The facility of claim 1, wherein the second permeate is recycled to the feed gas stream upstream of the compressor A.

4. The facility of claim 1, wherein the membranes used in the membrane separation units have a same selectivity.

5. The facility of claim 1, wherein at least one of said first, second, and third membrane separation units comprises at least two membranes.

6. The method for controlling the facility recited in claim 1, comprising the steps of:

a) measuring a pressure of the feed gas stream at the inlet of the first membrane separation unit using the at least one means for measuring a pressure, wherein the at least one means for measuring a pressure comprises at least one pressure sensor;

b) measuring a $CH_4$ concentration in the second retentate using the at least one means for measuring a $CH_4$ concentration, wherein the at least one means for measuring a $CH_4$ concentration comprises at least one $CH_4$ analyzer;

c) comparing the measured pressure of the feed gas stream and the measured $CH_4$ concentration in the second retentate with associated setpoint values and determining the differences between the measured pressure of the feed gas stream and the measured $CH_4$ concentration in the second retentate and the associated setpoint values; and d) adjusting the third-permeate suctioning pressure of the compressor B.

7. The method of claim 6, wherein the third-permeate suctioning pressure is adjusted by the compressor B and the pressure of the feed gas stream is adjusted by the compressor A or by a progressive shut-off and pressurizing valve.

8. The method of claim 7, wherein the adjusting of the pressure of the feed gas stream comprises increasing or decreasing the pressure.

9. The method of claim 6, wherein, in said step of adjusting, the compressor B is subjected to an acceleration or deceleration.

10. The method of claim 6, wherein the comparing, determining, and adjusting steps are performed automatically by a data transmission and data processing means.

11. The method of claim 6, wherein the feed gas stream is biogas.

\* \* \* \* \*